United States Patent
Suzuki (10) Patent No.: US 11,395,528 B2
(45) Date of Patent: Jul. 26, 2022

(54) MANUFACTURING METHOD OF RESIN ARTICLES

(71) Applicant: TOYOTA SHATAI KABUSHIKI KAISHA, Kariya (JP)

(72) Inventor: Rina Suzuki, Kariya (JP)

(73) Assignee: TOYOTA SHATAI KABUSHIKI KAISHA, Kariya (JP)

( * ) Notice: Subject to any disclaimer, the term of this patent is extended or adjusted under 35 U.S.C. 154(b) by 464 days.

(21) Appl. No.: 16/470,945

(22) PCT Filed: Oct. 10, 2017

(86) PCT No.: PCT/JP2017/036603
§ 371 (c)(1),
(2) Date: Jun. 18, 2019

(87) PCT Pub. No.: WO2018/123200
PCT Pub. Date: Jul. 5, 2018

(65) Prior Publication Data
US 2019/0373989 A1 Dec. 12, 2019

(30) Foreign Application Priority Data
Dec. 26, 2016 (JP) .............................. JP2016-250984

(51) Int. Cl.
*B29C 59/02* (2006.01)
*A44B 18/00* (2006.01)
*B29D 5/10* (2006.01)

(52) U.S. Cl.
CPC .......... *A44B 18/0046* (2013.01); *B29C 59/02* (2013.01); *B29D 5/10* (2013.01)

(58) Field of Classification Search
CPC ....... B29C 59/02; B29D 5/10; A44B 18/0046; A44B 18/0061
See application file for complete search history.

(56) References Cited

U.S. PATENT DOCUMENTS

2015/0289605 A1* 10/2015 Prest ...................... B22D 25/06
24/452

FOREIGN PATENT DOCUMENTS

| JP | 48-95026 A | 12/1973 |
| JP | 55-150325 A | 11/1980 |
| JP | 56-15322 A | 2/1981 |
| JP | 6-508315 A | 9/1994 |
| JP | 2015-77953 A | 4/2015 |
| WO | WO 93/00025 A1 | 1/1993 |

* cited by examiner

Primary Examiner — Timothy Kennedy
Assistant Examiner — Alexander A Wang
(74) Attorney, Agent, or Firm — Christensen, Fonder, Dardi & Herbert PLLC (57) ABSTRACT

A manufacturing method of a resin article having a plurality of filamentous projections that are formed in a contact surface of a resin article body may include a thrusting step to thrust acute-angled leading edges of plate-shaped metal parts into the contact surface of the resin article body, a heating step to heat the plate-shaped metal parts before or during the thrusting step, and a pulling out step to pull out the plate-shaped metal parts in a condition in which portions of the resin material of the resin article body is melted around the leading edges of the plate-shaped metal parts and in which melted resin portions are formed on unmelted portions of the resin material of the resin article body.

5 Claims, 8 Drawing Sheets

| SHAPE OF PLATE-SHAPED METAL PARTS | THICKNESS (t) | ANGLE θ | ANGLE φ | RESIN | RESULTS |
|---|---|---|---|---|---|
| EXAMPLE1 | UTILITY KNIFE BLADE SHAPE | 0.1mm, 0.3mm | 35 | 15 | PE | GOOD |
| EXAMPLE2 | UTILITY KNIFE BLADE SHAPE | 0.1mm, 0.3mm | 35 | 30 | PE | GOOD |
| EXAMPLE3 | UTILITY KNIFE BLADE SHAPE | 0.1mm, 0.3mm | 35 | 45 | PE | GOOD |
| EXAMPLE4 | UTILITY KNIFE BLADE SHAPE | 0.1mm, 0.3mm | 35 | 55 | PE | GOOD |
| CONTROL | NEEDLE SHAPE | — | — | 70 | PE | FAIL |

MANUFACTURING METHOD OF RESIN ARTICLES

CROSS-REFERENCE TO RELATED APPLICATIONS

The present application is a 35 U.S.C. § 371 National Phase entry of, and claims priority to, PCT Application No. PCT/JP2017/036603, filed Oct. 10, 2017, which in turn claims priority to Japanese Patent Application No. 2016-250984, filed Dec. 26, 2016, both of which are hereby incorporated herein by reference in their entireties for all purposes.

BACKGROUND

The present invention relates to a manufacturing method of a resin article having a plurality of filamentous projections formed on a contact surface of a resin article body such that the contact surface can adhere to a fibrous article.

A related art is taught by JP2015-77953A. A resin article taught by JP2015-77953A is directed to an insect screen for a vehicle window. The insect screen is provided with Magic Tape® (a Registered Trademark of a hook and loop fastener), i.e., hook-shaped projections and looped threads on which the hook-shaped projections are hooked. The hook-shaped projections and the looped threads are attached to a peripheral portion of the insect screen, so that the peripheral portion can be folded back and secured.

In Magic Tape® (a Registered Trademark) described above, the hook-shaped projections and the looped threads may be used in combination. Therefore, each of the hook-shaped projections and the looped threads cannot independently perform a fastening function. As a result, Magic Tape may have an increased cost relative to a fastening device that is configured to perform the fastening function only by the hook-shaped projections or the looped threads.

Thus, there is a need in the art to provide an improved manufacturing method of a resin article.

SUMMARY

A first aspect of the present disclosure may provide a manufacturing method of a resin article having a plurality of filamentous projections that are formed on a contact surface of a resin article body such that the contact surface can adhere to a fibrous article, which may include a thrusting step to thrust acute-angled leading edges of plate-shaped metal parts into the contact surface of the resin article body, a heating step to heat the plate-shaped metal parts to a temperature greater than a melting temperature of a resin material of the resin article body before or during the thrusting step, and a pulling out step to pull out the plate-shaped metal parts from the contact surface of the resin article body in a condition in which portions of the resin material of the resin article body is melted around the leading edges of the plate-shaped metal parts and in which melted resin portions are formed on unmelted portions of the resin material of the resin article body. In the pulling out step, the melted resin portions stuck to the leading edges of the plate-shaped metal parts are drawn from the melted resin portions of the resin article body and extended into filaments, so as to be formed into the projections.

According to this aspect, the heated leading edges of the plate-shaped metal parts may be thrust into the contact surface of the resin article body and then be pulled out therefrom. As a result, the melted resin portions stuck to the leading edges of the plate-shaped metal parts may be drawn from the melted resin portions of the resin article body and extended into filaments, so as to be formed into the projections. That is, some portions of the contact surface of the resin article body may be melted and drawn out, so that the filamentous projections may be formed. Therefore, the resin article having the filamentous projections formed therein may be manufactured at low cost. Further, the resin article may be configured to be adhered to the fibrous article via the plurality of filamentous projections. Therefore, no special entanglement structure may be required for the fibrous article to which the resin article is adhered. Therefore, the resin article may be useful from an economical point of view as compared with, for example, Magic Tape® (a Registered Trademark), which includes hook-shaped projections formed on an adhering (one) side thereof and looped threads formed on an adhered (the other) side thereof and configured such that the hook-shaped projections are hooked thereon.

In a second aspect of the present disclosure, the plate-shaped metal parts are configured to be reciprocated, so that the leading edges of the plate-shaped metal parts are thrust into and pulled out from the contact surface of the resin article body. An included angle between the contact surface of the resin article body and a reciprocating direction of the plate-shaped metal parts is set to an acute angle. Further, a sum of the included angle and an edge angle of each of the plate-shaped metal parts is set to an angle value smaller than 90 degrees. According to this aspect, the small filamentous projections may be efficiently formed.

In a third aspect of the present disclosure, a fixing device positioned in place and a movable device capable of reciprocating relative to the fixing device are provided. A large number of plate-shaped metal parts are attached to one of the fixing device and the movable device. Further, the resin article body is attached to the other of the fixing device and the movable device in a condition in which the contact surface of the resin article body is inclined at an angle with respect to the reciprocating direction. According to this aspect, a large number of projections may be formed on the contact surface of the resin article body at a time.

In a fourth aspect of the present disclosure, the plate-shaped metal parts are reciprocated relative to the contact surface of the resin article body so as to form the filamentous projections thereon. The resin article body is then rotated by a predetermined angle before the plate-shaped metal parts are again reciprocated relative to the contact surface of the resin article body so as to form the filamentous projections differing in projecting direction thereon. According to this aspect, the filamentous projections differing in projection direction may be formed on the contact surface of the resin article body. Therefore, the resin article can be more securely adhered to the fibrous article.

In a fifth aspect of the present disclosure, the resin article body is rotated about a central rotation shaft positioned perpendicular to the contact surface of the resin article body by a predetermined angle. According to this aspect, the filamentous projections differing in projecting direction may be efficiently formed on the contact surface of the resin article body.

DETAILED DESCRIPTION

Embodiment 1

<Regarding Structure of Resin Article 10>

Figure 1:
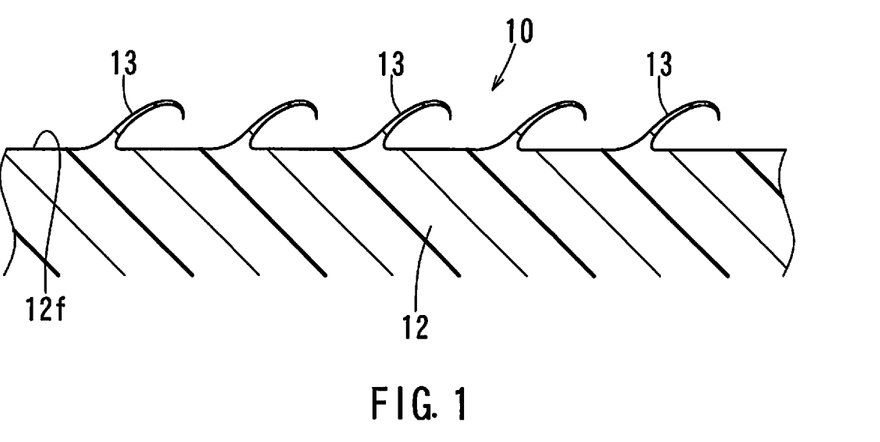
FIG. 1 is a schematic vertical cross-sectional view of a resin article according to Embodiment 1 of the present disclosure.

Below, a resin article 10 according to Embodiment 1 of the present disclosure and a manufacturing method thereof will be described with reference to FIGS. 1 to 13. An example of the resin article 10 according to the present embodiment is a resin band configured to be wrapped around an arm, a leg or other body part. As shown in FIG. 1, the resin article 10 may have a large number of filamentous projections 13 (which have a diameter of approximately 400 micrometer) formed on a surface 12f (a contact surface 12f) that is configured to contact a fibrous article. The large number of filamentous projections 13 may be entangled with the fibrous article, so that the resin article 10 is adhered to the fibrous article. That is, the resin article 10 may be constructed of a resin band body 12 and the large number of filamentous projections 13 formed on the contact surface 12f of the resin band body 12. Further, the resin band body 12 may be referred to as a resin article body in the present disclosure. Further, an example of a resin material of the resin article 10 is a polyethylene resin (PE) having a melting point of 95° C.-130° C.

<Regarding Projection Forming Machine 20 for Resin Article 10>

Figure 3:
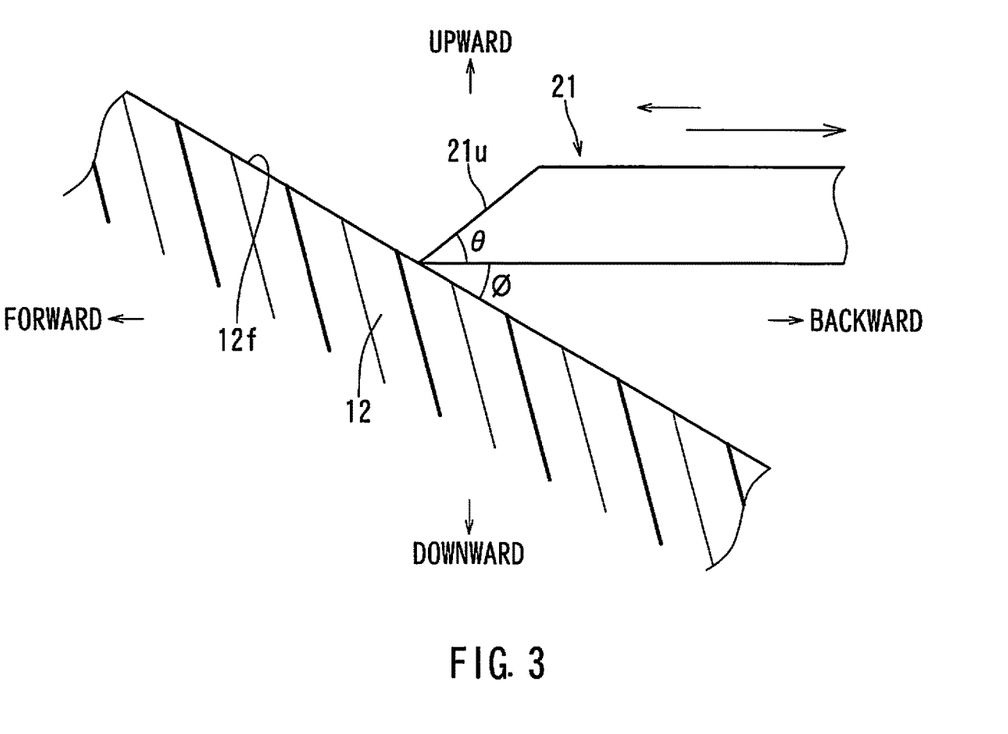
FIG. 3 is a side view of a resin article body, showing a method to form filamentous projections in a contact surface of the resin article body.
Figure 4:
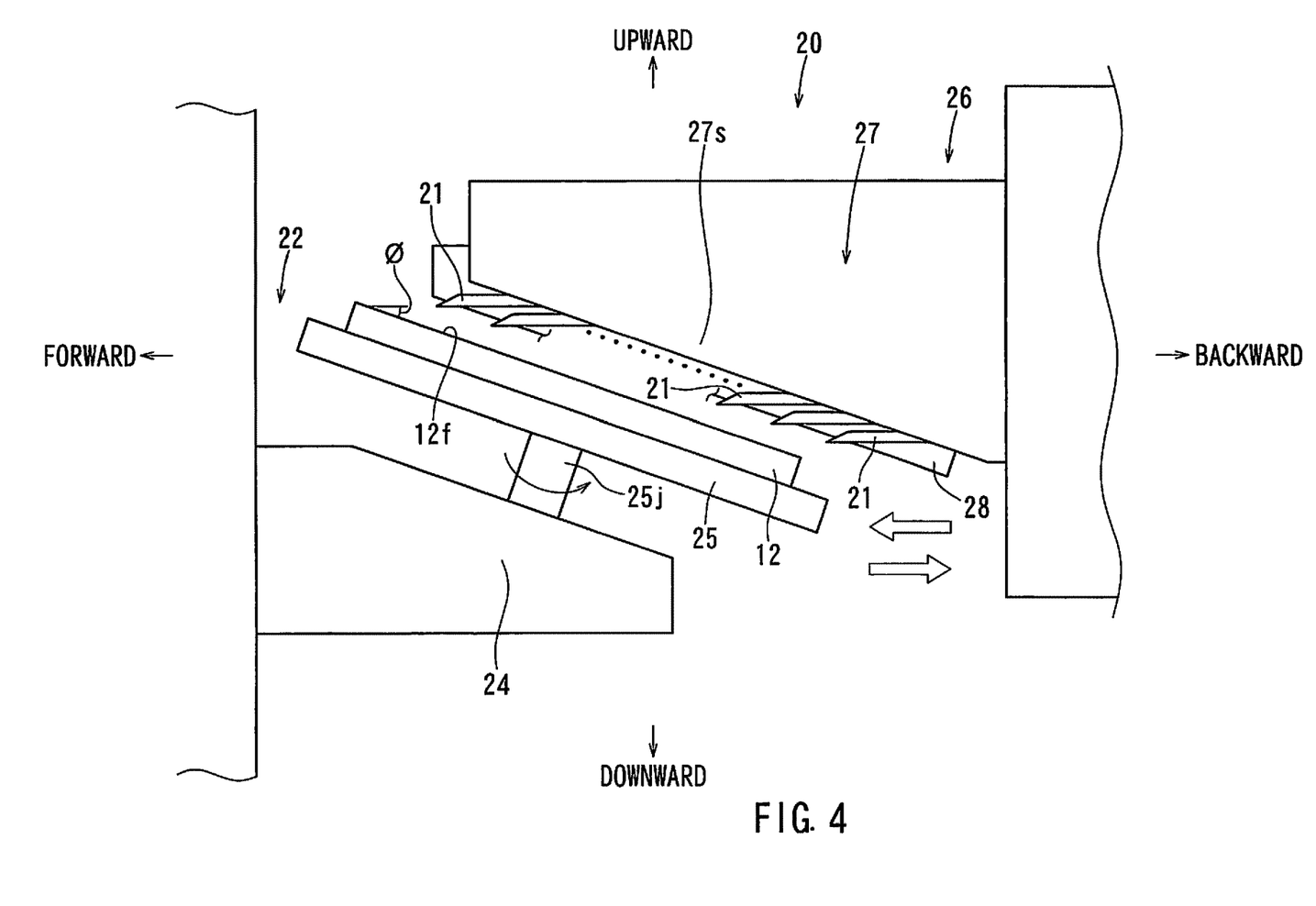
FIG. 4 is a side view of a machine for forming the filamentous projections on the contact surface of the resin article body.

A projection forming machine 20 may be a device for forming the large number of filamentous projections 13 in the contact surface 12f of the resin band body 12. As shown in FIG. 3 and various other figures, the projection forming machine 20 is configured to form the filamentous projections 13 by thrusting leading edges of heated plate-shaped metal parts 21 into the contact surface 12f of the resin band body 12 and then pulling out the plate-shaped metal parts 21 therefrom in a condition in which the resin material around the plate-shaped metal parts 21 is melted. As shown in FIG. 4, the projection forming machine 20 is composed of a fixing device 22 configured to position the resin band body 12 in place and a movable device 26 configured to move a large number of plate-shaped metal parts 21 back and forth (horizontally) in a condition in which the plate-shaped metal parts 21 are held in a horizontal position. Further, forward and backward, and upward and downward described in FIG. 4 and other figures may respectively correspond to forward and backward, and upward and downward of the projection forming machine 20.

Figure 5:
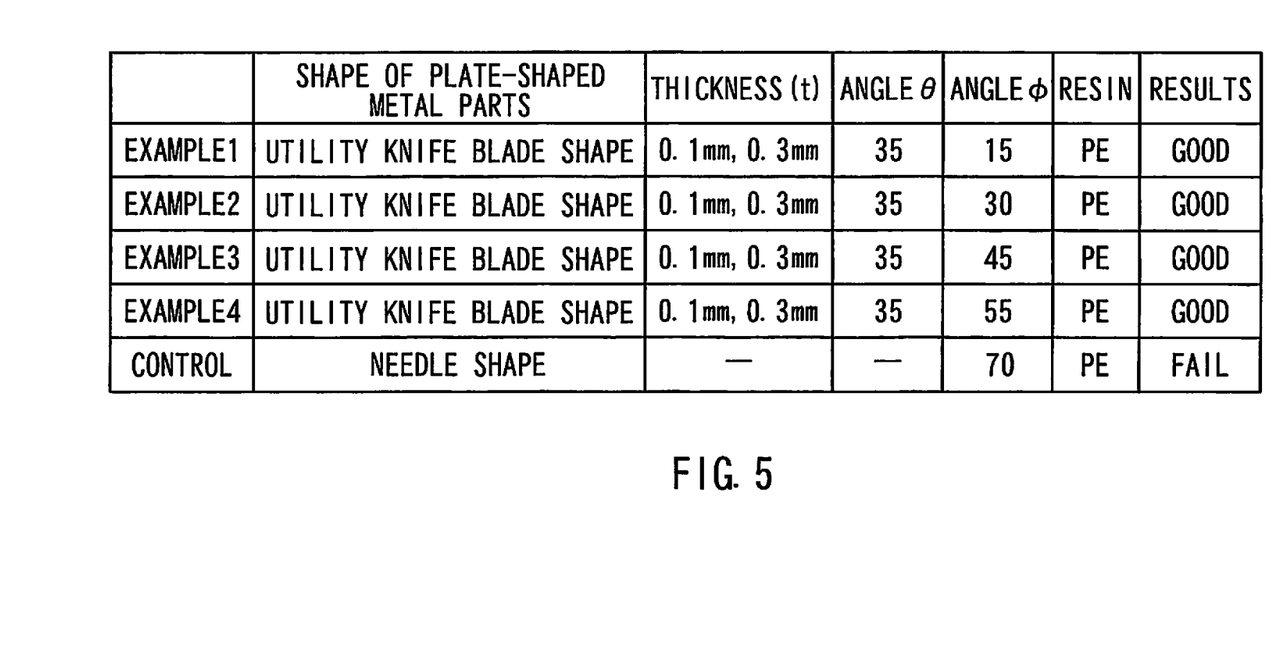
FIG. 5 is a table showing Examples and Controls in which the filamentous projections are formed on the contact surface of the resin article body under different conditions.

The fixing device 22 is configured to support the resin band body 12 such that the contact surface 12f of the resin band body 12 is inclined at an angle φ with respect to a horizontal line. As shown in FIG. 4, the fixing device 22 may include an inclined rotatable table 25 configured to support the resin band body 12 and a table support base 24 configured to rotatably support a central rotation shaft 25j of the inclined rotatable table 25. The central rotation shaft 25j may be positioned perpendicular to the inclined rotatable table 25. Further, the rotation shaft 25j may be coupled to a drive mechanism (not shown), e.g., a motor, disposed on the table support base 24. Therefore, when the drive mechanism of the fixing device 22 is activated, the inclined rotatable table 25 may be rotated about an axis of the central rotation shaft 25j. Further, the fixing device 22 is configured to be capable of adjusting an inclination angle of the central rotation shaft 25j with respect to the table support base 24. Therefore, as shown in FIG. 5, the inclination angle φ of the inclined rotatable table 25 with respect to the horizontal line can be set to various angles such as 15 degrees (Example 1), 30 degrees (Example 2), 45 degrees (Example 3) or 55 degrees (Example 4).

As shown in FIG. 4, the movable device 26 may have a metal part support base 27 horizontally supporting the large number of plate-shaped metal parts 21 in parallel to each other. In particular, the metal part support base 27 may have an oblique metal part support portion 27s formed on a lower side thereof and configured to support the large number of plate-shaped metal parts 21. Further, the large number of plate-shaped metal parts 21 may be positioned on the metal part support portion 27s at regular intervals so as to correspond to predetermined target positions on the resin band body 12 (the contact surface 12f) supported by the inclined rotatable table 25. Further, the metal part support base 27 may have a heating device 28 attached to the metal part support portion 27s and used to heat the large number of plate-shaped metal parts 21. The heating device 28 may be configured to heat the large number of plate-shaped metal parts 21 to a temperature equal to or greater than a melting point of the resin material.

As shown in FIG. 3, according to the structure described above, when the movable device 26 moves forward by a certain distance, the leading edge of each of the plate-shaped metal parts 21 heated by the heating device 28 may be thrust into the contact surface 12f of the resin band body 12 supported by the inclined rotatable table 25 at the angle φ. Further, when the movable device 26 moves backward, the leading edge of each of the plate-shaped metal parts 21 may be pulled out from the contact surface 12f of the resin band body 12 supported by the inclined rotatable table 25 at the angle φ. Further, a front-back direction of the projection forming machine 20 may correspond to a reciprocating direction of the plate-shaped metal parts in the present disclosure.

<Regarding Plate-Shaped Metal Parts 21>

Figure 2:
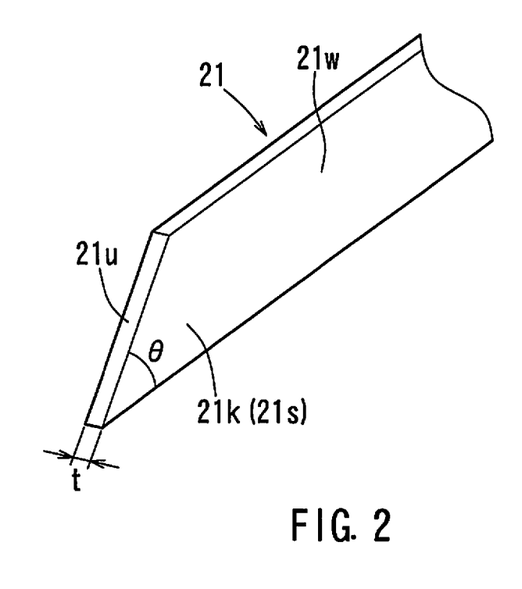
FIG. 2 is a perspective view of a plate-shaped metal part that is used in the manufacture of the resin article.

As shown in FIG. 2 and other figures, each of the plate-shaped metal parts 21 may be formed as a utility knife blade-shaped steel plate having a wedge-shaped edge portion 21k and a band plate portion 21w. As shown in the table of FIG. 5, the plate-shaped metal parts 21 each having a thickness t of 0.1 mm or 0.3 mm. The thickness t may be varied depending on a desired size of each of the filamentous projections 13. Further, each of the plate-shaped metal parts 21 may have an edge angle θ that is set to, for example, 35 degrees. Further, as shown in FIG. 3, the plate-shaped metal parts 21 may be held in parallel to a plane perpendicular to the contact surface 12f of the resin band body 12. Therefore, the plate-shaped metal parts 21 may be thrust into the contact surface 12f of the resin band body 12 at the angle φ and subsequently pulled out therefrom at the angle φ. Further, as shown in FIG. 3, a sum of the edge angle θ of each of the plate-shaped metal parts 21 and an included angle (the same as the angle φ) between the contact surface 12f of the resin band body 12 and the reciprocating direction (front-back direction (horizontal direction)) of the plate-shaped metal parts 21 may be set to a summed angle value smaller than 90 degrees.

<Regarding Projection Forming Method of Resin Article 10>

Next, a method of forming the filamentous projections 13 in the resin band body 12 of the resin article 10 using the projection forming machine 20 will be described. First, the inclination angle of the central rotation shaft 25j with respect to the table support base 24 of the projection forming machine 20 is adjusted, so as to adjust the inclination angle φ of the inclined rotatable table 25 with respect to the reciprocating direction (horizontal direction) of the plate-shaped metal parts 21. As shown in the table of FIG. 5, the inclination angle φ (the angle φ) may preferably be set to 15 degrees, 30 degrees, 45 degrees or 55 degrees. Thereafter, as shown in FIG. 4, the resin band body 12 may be positioned on the inclined rotatable table 25 with the contact surface 12f thereof facing outward. Further, the thickness of each of the plate-shaped metal parts 21 may be determined depending on a diameter of each of the filamentous projections 13, and the plate-shaped metal parts 21 having a thickness of 0.1 mm or 0.3 mm are attached to the metal part support base 27 of the projection forming machine 20.

Figure 6:
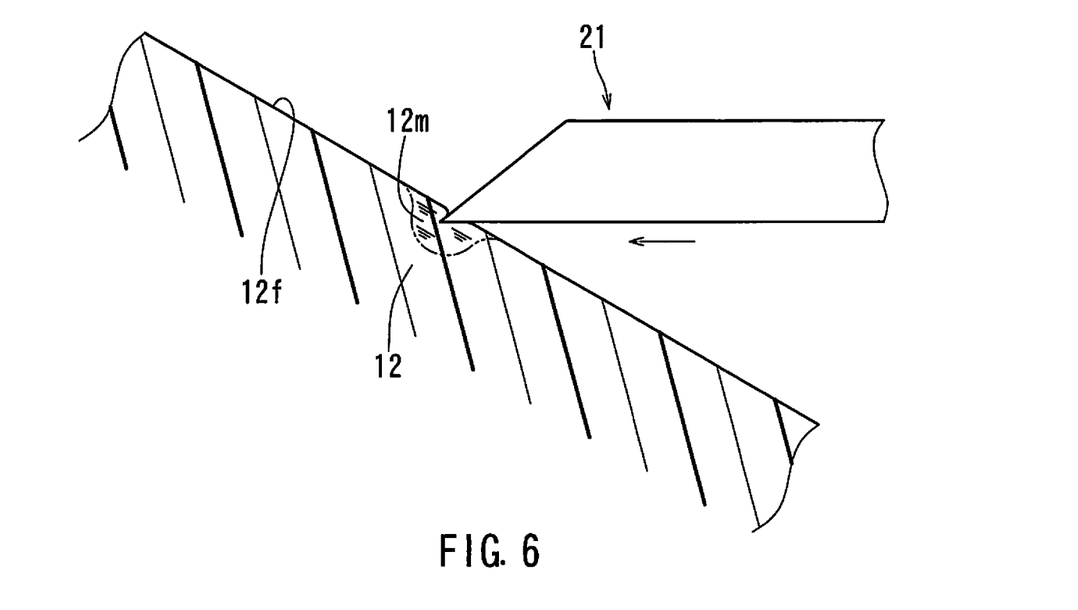
FIG. 6 is a side view of the resin article body, showing the method to form the filamentous projections on the contact surface of the resin article body.
Figure 7:
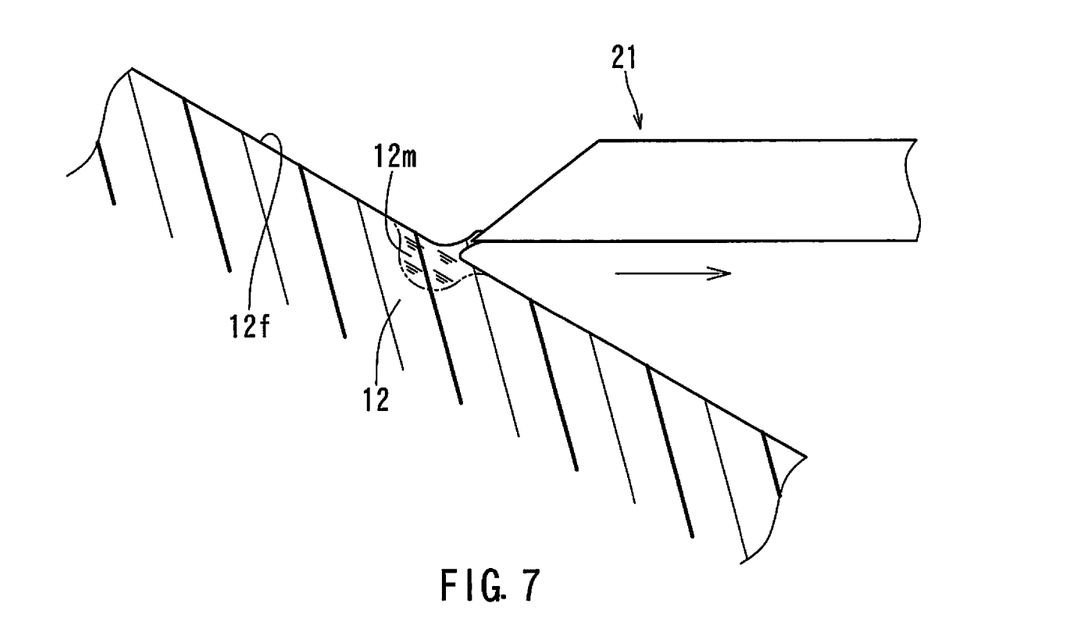
FIG. 7 is a side view of the resin article body, showing the method to form the filamentous projections on the contact surface of the resin article body.
Figure 8:
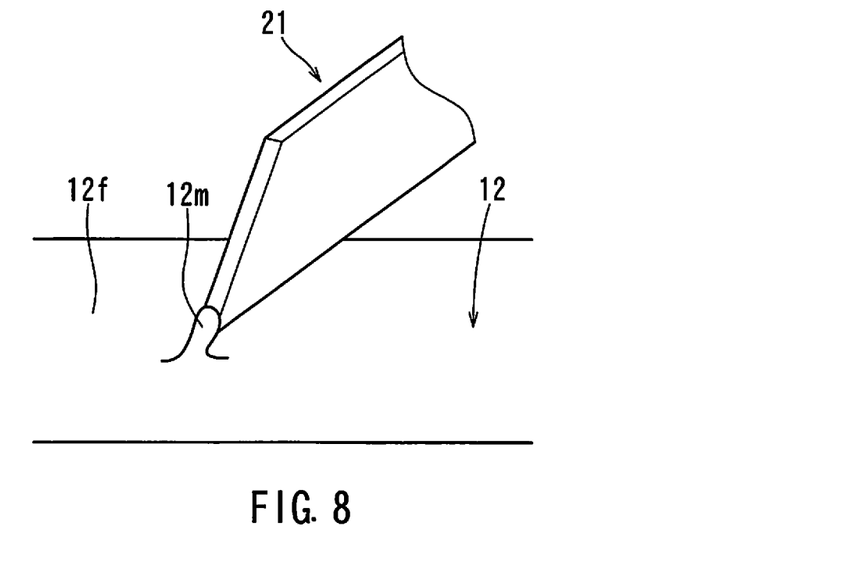
FIG. 8 is a perspective view of the resin article body, showing the method to form the filamentous projections on the contact surface of the resin article body.
Figure 9:
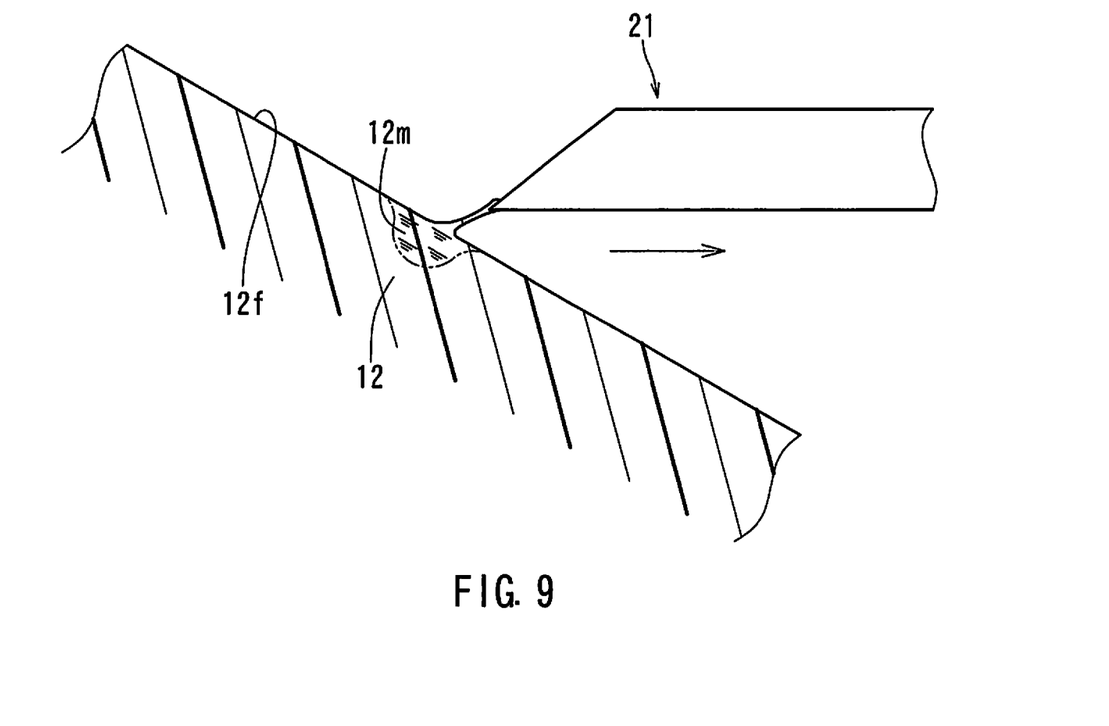
FIG. 9 is a side view of the resin article body, showing the method to form the filamentous projections on the contact surface of the resin article body.
Figure 10:
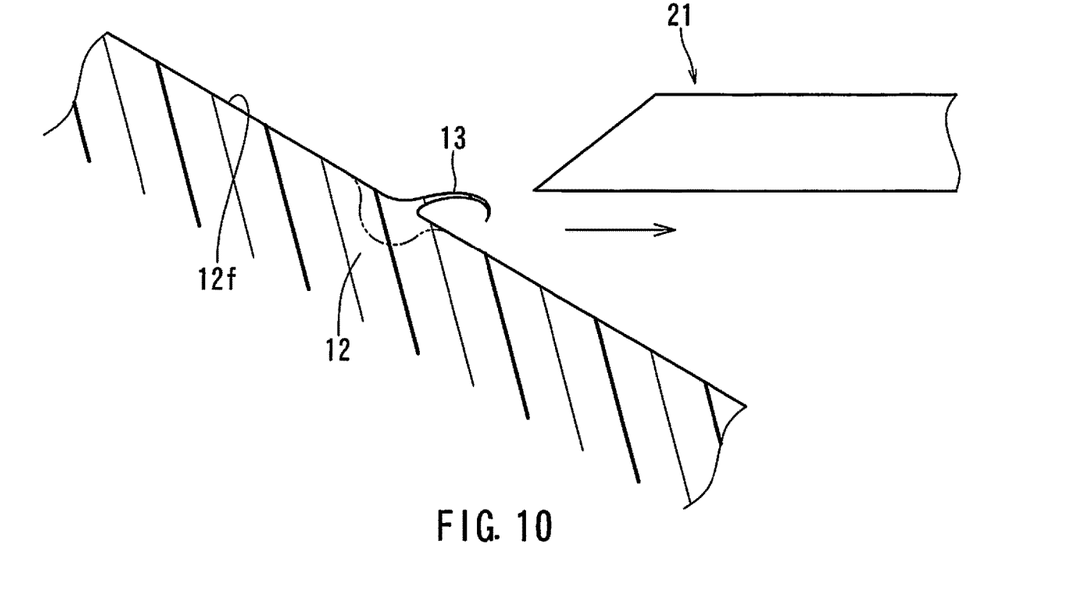
FIG. 10 is a side view of the resin article body, showing the method to form the filamentous projections on the contact surface of the resin article body.

Next, the plate-shaped metal parts 21 may be heated to a temperature equal to or greater than the melting point (melting temperature) of the resin material of the resin band body 12 using the heating device 28 attached to the metal part support base 27 of the projection forming machine 20. In this heated state, as shown in FIG. 6, the metal part support base 27 of the projection forming machine 20 may be moved forward by a certain distance, so that the leading edges of the plate-shaped metal parts 21 may be thrust into the contact surface 12f of the resin band body 12. After a predetermined period of time, the resin band body 12 may reach a condition in which the resin material of the resin band body 12 may be melted around the leading edges of the plate-shaped metal parts 21 and in which melted resin portions 12m are formed on the unmelted resin material of the resin band body 12. In this condition, the metal part support base 27 of the projection forming machine 20 may be moved backward. As a result, the leading edges of the plate-shaped metal parts 21 may be pulled out from the contact surface 12f of the resin band body 12. At this time, as shown in FIGS. 7 to 9, the melted resin portions 12m stuck to the leading edges of the plate-shaped metal parts 21 may be drawn from the melted resin portions 12m of the resin band body 12 and extended to form filaments. Thereafter, as shown in FIG. 10, the melted resin portions 12m stuck to the leading edges of the plate-shaped metal parts 21 are removed from the leading edges or broken in the middle thereof, so that the filamentous projections 13 may be formed.

Further, as shown in FIG. 2, the leading edge of each of the plate-shaped metal parts 21 (the wedge-shaped edge portion 21k) may include an inclined surface 21u and opposite side wall surfaces 21s that are respectively formed as flat surfaces, so that the melted resin portions 12m is easily adhered thereto. Therefore, when the leading edges of the plate-shaped metal parts 21 are pulled out from the contact surface 12f of the resin band body 12, the melted resin portions 12m may be well extended. To the contrary, as shown by the Control in the table of FIG. 5, when needle-shaped metal parts each having a conical leading edge are used instead of the plate-shaped metal parts 21, the melted resin portions 12m is not well adhered thereto. As a result, the melted resin portions 12m may not be well extended.

Thus, the large number of filamentous projections 13 may be formed on the contact surface 12f of the resin band body 12. Further, in order to additionally form the projections 13 differing in projecting direction, the inclined rotatable table 25 of the projection forming machine 20 may be rotated about the axis of the central rotation shaft 25j by a predetermined rotational angle. Thereafter, as described above, the metal part support base 27 of the projection forming machine 20 may be moved forward by the predetermined distance. Subsequently, the metal part support base 27 may be moved backward after a predetermined time has elapsed. Thus, the projections 13 differing in projecting direction may be additionally formed. In addition, in order to form the projections 13 differing in inclination angle, the procedures described above may be repeated after the inclination angle φ of the inclined rotatable table 25 may be changed. Thus, the projections 13 differing in inclination angle may also be formed.

<Advantages of Resin Article 10 According to Present Embodiment>

Using the manufacturing method of the resin article 10 according to the present embodiment, the leading edges of the plate-shaped metal parts 21 may be heated and then be thrust into the contact surface 12f of the resin band body 12 (the resin article body). Thereafter, the plate-shaped metal parts 21 may be pulled out from the contact surface 12f. As a result, the melted resin portions 12m stuck to the leading edges of the plate-shaped metal parts 21 may respectively be drawn from the melted resin portions 12m of the resin band body 12 and extended into filaments, so as to be formed into the projections 13. That is, some portions of the contact surface 12f of the resin band body 12 may be melted and drawn out, so that the filamentous projections 13 may be formed. Therefore, the resin article 10 having the filamentous projections 13 formed thereon may be manufactured at a low cost. Further, the resin article 10 may be configured to be adhered to the fibrous article via the plurality of filamentous projections 13. Therefore, no special entanglement structure is required for the fibrous article to which the resin article 10 is to be adhered. Therefore, the resin article 10 may be useful from an economical point of view as compared with, for example, Magic Tape® (a Registered Trademark), which includes hook-shaped projections formed on an adhering (one) side thereof and looped threads formed on an adhered (the other) side thereof and configured such that the hook-shaped projections are hooked thereon.

Further, the projection forming machine 20 is configured to horizontally reciprocate the plate-shaped metal parts 21, so that the leading edges of the plate-shaped metal parts 21 are thrust into and pulled out from the contact surface 12f of the resin band body 12. The included angle formed between the contact surface 12f of the resin band body 12 and the horizontal line (the reciprocating direction) may be set to the angle φ. Further, the sum of the angle φ and the edge angle θ of each of the plate-shaped metal parts 21 may be set to the angle value smaller than 90 degrees (FIG. 3). Therefore, the small filamentous projections 13 may be efficiently formed. Further, the filamentous projections 13 differing from each other in projecting direction may be formed on the contact surface 12f of the resin band body 12, so that the resin article 10 may securely adhere to the fibrous article.

<Modified Forms>

Figure 11:
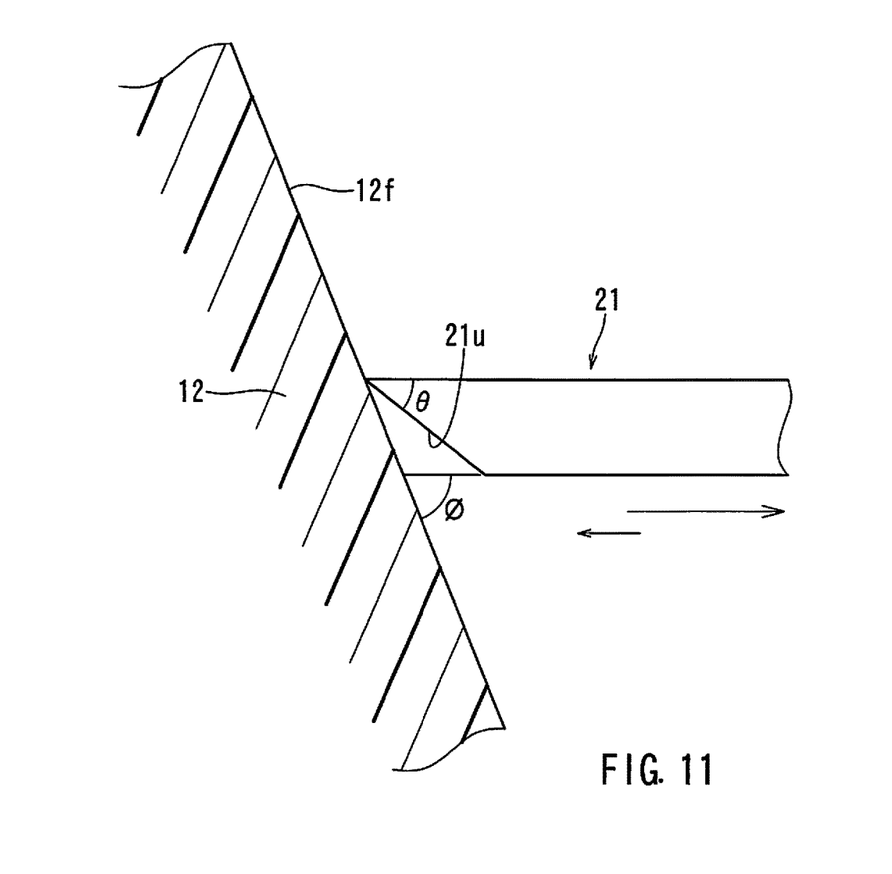
FIG. 11 is a side view of the resin article body, showing a condition in which an inclination angle of the plate-shaped metal part is changed.
Figure 12:
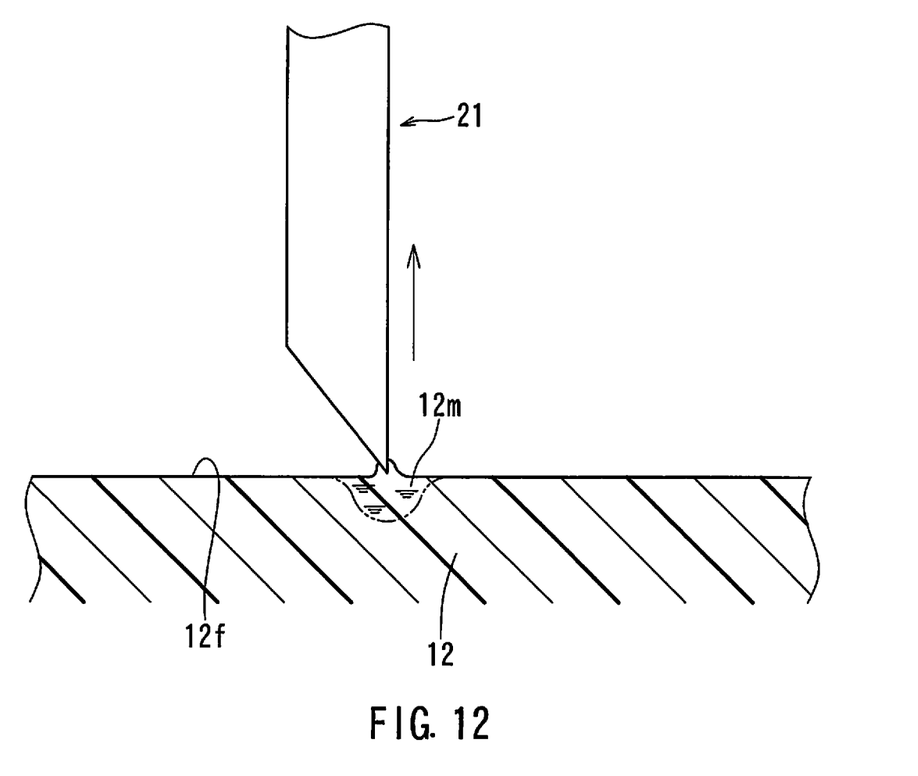
FIG. 12 is a side view of a resin article body, showing a method to form filamentous projections according to a modified form.
Figure 13:
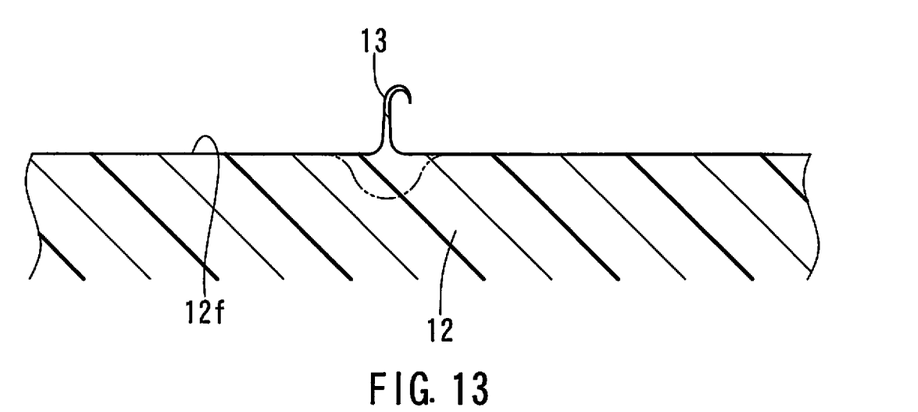
FIG. 13 is a side view of the filamentous projections according to the modified form.

The present embodiment can be changed or modified without departing from the scope of the present disclosure. For example, as shown in FIG. 3 and other figures, in the present embodiment, the wedge-shaped edge portion 21k of each of the plate-shaped metal parts 21 has the inclined surface 21u that is formed on an upper side of the wedge-shaped edge portion 21k. However, as shown in FIG. 11, the inclined surface 21u may be formed on a lower side of the wedge-shaped edge portion 21k of each of the plate-shaped metal parts 21. Further, as shown in FIG. 3 and other figures, in the present embodiment, the inclination angle φ of the inclined rotatable table 25 with respect to the reciprocating direction (horizontal direction) of the plate-shaped metal parts 21 is set to an acute angle. However, as shown in FIG. 12, the inclined rotatable table 25 may be positioned such that a table surface thereof is perpendicular to the reciprocating direction (horizontal direction) of the plate-shaped metal parts 21. In such a case, the projections 13 may be formed on the contact surface 12f of the resin band body 12 so as to be perpendicular thereto. Further, in this case, as shown in FIG. 13, a distal end of each of the filamentous projections 13 may be curved downward under a force of gravity, so that a hook-shaped portion may be formed therein.

Further, in the present embodiment, the resin band body 12 is attached to the fixing device 22 of the projection forming machine 20 while the plate-shaped metal parts 21 and the heating device 28 are attached to the movable device 26. However, the resin band body 12 may be attached to the movable device 26 of the projection forming machine 20 while the plate-shaped metal parts 21 and the heating device 28 may be attached to the fixing device 22. Further, in the present embodiment, the plate-shaped metal parts 21 are heated by the heating device 28 before the plate-shaped metal parts 21 are thrust into the contact surface 12f of the resin band body 12. However, the plate-shaped metal parts 21 may be heated by the heating device 28 at a time when the plate-shaped metal parts 21 have been thrust into the contact surface 12f of the resin band body 12. Further, in the present embodiment, a polyethylene resin (PE) is used as the resin material of the resin band body 12. However, a polypropylene resin (PP) or other such resins may be used instead of the polyethylene resin (PE).

The invention claimed is:

1. A manufacturing method of a resin article having a plurality of filamentous projections that are formed on a contact surface of a resin article body such that the contact surface can adhere to a fibrous article, comprising:
    a thrusting step to thrust acute-angled leading edges of plate-shaped metal parts into the contact surface of the resin article body;
    a heating step to heat the plate-shaped metal parts to a temperature greater than a melting temperature of a resin material of the resin article body before or during the thrusting step; and
    a pulling out step to pull out the plate-shaped metal parts from the contact surface of the resin article body in a condition in which portions of the resin material of the resin article body around the leading edges of the plate-shaped metal parts are melted into melted resin portions while remaining portions of the resin material of the resin article body are not melted,
    wherein in the pulling out step, the melted resin portions stuck to the leading edges of the plate-shaped metal parts are drawn from the melted resin portions of the resin article body and extended into filaments, so as to be formed into the projections.

2. The manufacturing method as described in claim 1, wherein the plate-shaped metal parts are configured to be reciprocated, so that the leading edges of the plate-shaped metal parts are thrust into and pulled out from the contact surface of the resin article body,
    wherein an included angle between the contact surface of the resin article body and a reciprocating direction of the plate-shaped metal parts is set to an acute angle, and
    wherein a sum of the included angle and an edge angle of each of the plate-shaped metal parts is set to an angle value smaller than 90 degrees.

3. The manufacturing method as described in claim 1, wherein a fixing device positioned in place and a movable device capable of reciprocating relative to the fixing device are provided, wherein a large number of plate-shaped metal parts are attached to one of the fixing device and the movable device, and wherein the resin article body is attached to the other of the fixing device and the movable device in a condition in which the contact surface of the resin article body is inclined at an angle with respect to the reciprocating direction.

4. The manufacturing method as described in claim 2, wherein the plate-shaped metal parts are reciprocated relative to the contact surface of the resin article body so as to form the filamentous projections thereon, and
    wherein the resin article body is then rotated by a predetermined angle before the plate-shaped metal parts are again reciprocated relative to the contact surface of the resin article body so as to form the filamentous projections differing in projecting direction thereon.

5. The manufacturing method as described in claim 4, wherein the resin article body is rotated about a central rotation shaft positioned perpendicular to the contact surface of the resin article body by a predetermined angle.

* * * * *